Dec. 1, 1925.

G. Q. BEDORTHA 1,563,321

SPIRIT LEVEL GLASS

Filed Sept. 6, 1921

Inventor:
George Q. Bedortha
by Harry R. Williams
atty.

Patented Dec. 1, 1925.

1,563,321

UNITED STATES PATENT OFFICE.

GEORGE Q. BEDORTHA, OF WINDSOR, CONNECTICUT.

SPIRIT-LEVEL GLASS.

Application filed September 6, 1921. Serial No. 498,660.

*To all whom it may concern:*

Be it known that I, GEORGE Q. BEDORTHA, a citizen of the United States, residing at Windsor, in the county of Hartford and State of Connecticut, have invented a new and useful Improvement in Spirit-Level Glasses, of which the following is a specification.

This invention relates to those spirit level glasses in which a colored fluorescent liquid is employed to increase the visibility of the air bubble, such, for instance, as is illustrated and described in United States patent to Wood No. 692,097, January 28, 1902.

In level glasses of this class as previously made exposure to light in time causes the liquid to lose its fluorescence with consequent reduction of visibility of the air bubble.

The object of this invention is to provide a spirit level glass in which the action of light is so controlled as to prevent the loss of fluorescence, without decreasing the visibility, whereby the liquid will retain its fluorescence for a much longer time than is the case with the prior glasses.

This object is accomplished by making the tube which contains the fluorescent liquid of glass, or covering such tube with glass, which, while giving high visibility to the fluid, will absorb, rather than transmit, the ultra-violet rays of light, these being rays which vitiate the fluorescence of the liquid.

Figure 1:
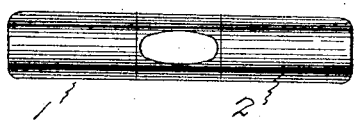
Figure 2:
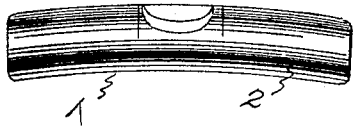

In the accompanying drawings Figure 1 shows a plan of a spirit level tube. Fig. 2 shows a side view of the same.

The article comprises a glass tube 1 which is slightly curved and is closed at both ends. In this tube is a fluorescent liquid 2 that is, a liquid which is one color by transmitted light and another color by reflected light. This liquid may be fluorescein or eosine dissolved in alcohol or other suitable fluid, with the addition of a slight quantity of alkali, as soda or potash to increase the fluorescence, if desired.

The tube is made of glass, preferably of a yellow tint, which absorbs the ultra-violet rays, such glass, for instance, as that which is commonly known in the optical trade as "Noviol" glass, or those glasses containing silver-oxide for producing selective absorption by the glass of ultra-violet and violet rays. A medium shade of this glass while having selective absorption for ultra-violet and a portion of the violet and blue rays, does not greatly reduce the fluorescence of the liquid and permits a clear vision of the liquid and air bubble in the tube. In such a glass tube the fluid retains its desired characteristics for a long period.

The invention claimed is:—

1. A spirit level glass comprising a sealed tube containing a colored fluorescent liquid and an air bubble, said tube being made of transparent glass having selective absorption of ultra-violet and violet light rays.

2. A spirit level glass comprising a closure containing a yellow fluorescent liquid having an air bubble, said closure being made of glass having a yellow tint and a selective absorption of ultra-violet and violet light rays.

GEORGE Q. BEDORTHA.